Patented May 22, 1945

2,376,637

UNITED STATES PATENT OFFICE 2,376,637

PROCESS FOR PRODUCING ISOCYTOSINE

Edmond T. Tisza and Bernard F. Duesel, Yonkers, and William Oroshnik, Brooklyn, N. Y., assignors, by mesne assignments, to Nepera Chemical Co. Inc., a corporation of New York No Drawing. Application August 29, 1941,
Serial No. 408,816

9 Claims. (Cl. 260—251)

Our invention relates to heterocyclic compounds and refers particularly, but without limitation, to processes for the production of isocytosine.

The usual methods of preparing isocytosine are either by reacting a guanidine salt with formylacetic acid in acid medium, or, by reacting sodium ethyl formylacetate (sodium formylacetic ester) with free guanidine as described by Wheeler and Johnson (American Chemical Journal, vol. 29, (1903) page 496).

We have found that we can prepare isocytosine in a very convenient way by reacting in alkyl formate with an alkyl acetate in the presence of sodium or sodium alcoholate and adding to the reaction mixture a guanidine salt in aqueous alkali metal hydroxide solution.

The advantages of the present process are obvious. As will be seen in the specification, the procedure is greatly simplified, as all the steps of the process necessary to the production of the isocytosine constitute a continuous operation in a single vessel. Furthermore, the entire process can be done in a single jacketed iron kettle equipped with a stirrer, in contrast to the acid method which requires several glass lined vessels. Our process does not require very low temperatures, therefore the cooling can be accomplished by ordinary water. Another advantage of our process is that the isolation and purification of sodium ethyl formyl acetate is troublesome and somewhat difficult, which objectionable features are overcome and eliminated by our process, in which this compound can be used in its crude form without isolation and purification.

In carrying out our invention we use metallic sodium or we prepare the sodium alcoholate from metallic sodium and the alcohol in an indifferent solvent, though commercially available sodium methylate may also be used. This solvent may be an aromatic compound such as benzene, toluene or xylene, etc., or it may be a light aliphatic hydrocarbon of which, being easily available and cheap, kerosene is preferred. It is important however, that the solvent used should be miscible with the alcohols liberated in the reaction. Another advantage of this invention is the ease of isolation of the desired product. No large volumes of liquids are handled by our process in comparison to other methods. Further objects of the invention can be seen from the specifications.

The alcohol used for making the sodium alcoholate may be any of the primary alcohols such as methyl-, ethyl-, propyl-, butyl alcohol, or higher alcohols such as hexyl-, octyl-, nonyl alcohol, or they may be secondary alcohols as isopropyl- or amyl alcohol, or they may be aromatic alcohols as benzylalcohol, etc.

The esters, alkyl formate and alkyl acetate, used in our process may contain the same alkyl group as the alcohol used for making the sodium alcoholate, or they may be different. We can utilize sodium ethylate with ethyl formate and ethyl acetate, or, for instance, sodium butylate with the two esters just mentioned. We prefer however to use the same alkyl group throughout, as this simplifies the recovery of the alcohol and makes the process more economical.

We can use any guanidine salt, carbonate, nitrate, sulfate, etc. in our process as the liberated acid radical combines with the sodium ions present. We prefer to use guanidine nitrate because the formed sodium nitrate requires less water to keep it in solution, than would be the case with the use of sodium sulfate.

The following illustrates the chemical reactions that take place step by step.

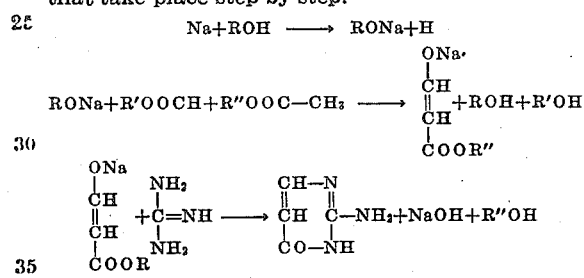

In the above formulae R represents an alkyl or an arylalkyl radical, R', and R" represent the same or different alkyl radicals, these alkyl radicals being selected from a group of monovalent radicals derived from a saturated hydrocarbon. They may be the normal or isomeric alkyl radicals and contain not more than 9 carbon atoms each. Those with 4 carbon atoms appear to be the most effective.

The following are several illustrative examples of some of the preferred procedures of carrying out the present invention, which are given for illustration and not for limitation.

*Example 1*

165 grams commercial sodium methylate are suspended in 1500 ccs. xylene in a flask equipped with a stirrer and reflux condenser. The suspension is cooled in a waterbath to 15° C. and a mixture consisting of 222 grams ethyl formate and 264 grams ethyl acetate is run in under constant stirring, taking care that the temperature does not rise above 20° C. The stirring is continued at 15–20° C. for six hours, then continued for another 40 hours at room temperature. The reaction mixture consists of a fine yellow suspension at this time.

85 grams of caustic soda are now dissolved in 300 ccs. of water and 243 grams of guanidine nitrate (92%) are suspended in same. This suspension is now added to the above described reaction mixture and stirred for two hours at 75–80°. After cooling, a large amount of crystals of the sodium salt of isocytosine is precipitated. The entire mixture is filtered and the collected crystals are sucked dry. They are dissolved in 300 cc. water, the solution is filtered and 30 grams sodium chloride are dissolved therein. The solution is now carefully acidified with concentrated hydrochloric acid and brought back to pH 7.5 with ammonia water and cooled. The isocytosine precipitates in almost white crystalline form, which is collected on a filter and washed with 10% salt solution. The yield is 119 grams.

*Example 2*

2000 ccs. kerosene and 70 grams absolute ethanol are placed in a flask equipped with a stirrer and reflux condenser and 70 grams sodium, cut into small pieces are added. It is heated to 100° C., at which temperature the sodium melts and reacts vigorously with the ethanol. When the reaction slows down 68 grams more ethanol are added in small portions. The temperature is now raised to 110° C. and kept at that temperature for two hours under stirring. The reaction mixture consisting of a paste of sodium ethylate in kerosene is cooled down in a water bath to 15° C. and a mixture of 222 grams ethyl formate and 264 grams ethyl acetate is added in a thin stream under continuous stirring, taking care that the temperature does not go over 20° C. The stirring is maintained for 6 hours at 15–20° C. and continued for another 40 hours at room temperature.

This reaction mixture is now treated with 243 grams of guanidine nitrate suspended in a solution of 85 grams caustic soda in 300 ccs. of water as in Example 1. The yield is 117 grams isocytosine.

*Example 3*

2000 ccs. kerosene and 180 grams isopropanol are placed into a flask and 70 grams sodium are added as in Example 2. After the reaction subsides, the temperature is raised to 120° C. and maintained for 6 hours to complete the reaction. After cooling down to 15° C., the same amount of esters and subsequently guanidine nitrate in caustic soda solution are added and worked as in Example 2. The yield is 83.5 grams isocytosine.

*Example 4*

1000 ccs. kerosene and 222 grams n-butanol are placed into a flask, and 70 grams sodium are added, as in Example 2. After the reaction subsides the temperature is raised to 135° C. and maintained for two hours to complete the reaction. After cooling down to 15° C. the other reagents are added and worked as in Example 2. The yield is 136 grams isocytosine.

*Example 5*

1370 ccs. xylene and 328 grams benzylalcohol are placed into a flask, and 70 grams sodium are added as in Example 2. After the reaction subsides, the temperature is raised to 110° C. to complete the reaction. After cooling down to 15° C., the other reagents are added and worked up as in Example 2. The yield is 84.5 grams isocytosine.

*Example 6*

875 ccs. kerosene and 224 grams n-butanol are placed into a flask and 70 grams sodium are added and the sodium butylate is prepared as in Example 4. After cooling down to 15° C., a mixture of 350 grams butyl acetate and 304 grams butyl formate is added in a thin stream under continuous stirring, taking care that the temperature does not go over 20° C. The reaction is continued from this point on as in Example 4. The yield is 128 grams isocytosine.

*Example 7*

500 ccs. high flash naptha and 70 grams sodium are placed into a flask and heated to about 100° C. After all the sodium is molten, the contents are stirred vigorously and cooled down slowly. During the cooling the sodium solidifies in fine granules. When the suspension is cooled down in a water bath to about 15°–20° C., a mixture of 222 grams ethyl formate and 264 grams ethyl acetate is run in under constant stirring, taking care that the temperature does not rise above 20° C. The stirring is continued for another 40 hours at room temperature. Now 500 ccs. more naptha are added and the same amount of guanidine nitrate in caustic soda solution is added and worked as in Example 2. The yield is 115 grams isocytosine.

We have shown that by a slight changing of the alkyl radicals many apparently widely different embodiments of this invention may be made without departing from the spirit thereof.

We do not limit ourselves to the specifically mentioned times, temperatures, quantities, chemicals, or steps of procedure as these are given simply to clearly describe our invention as set forth in our specification and claims and they may be varied without going beyond the scope of our invention.

What we claim is:

1. In a continuous method of preparing isocytosine, the steps which comprise reacting in a nonreacting solvent an alkyl formate with an alkyl acetate in the presence of a member of the group consisting of sodium and sodium alcoholate and reacting the thus formed mixture containing sodium alkyl formyl acetate with an alkaline suspension of a guanidine salt.

2. The continuous method of preparing isocytosine by reacting in a nonreacting solvent an alkyl formate and an alkyl acetate in the presence of a member of the group consisting of sodium and sodium alcoholate, reacting the formed sodium alkyl formyl acetate with an alkaline suspension of a guanidine salt, decomposing the thus formed mixture containing sodium isocytosine with an acid and collecting the free isocytosine.

3. In a continuous method of preparing isocytosine the steps which comprise reacting in a nonreacting solvent an alkylformate with an alkyl acetate in the presence of a member of the group consisting of sodium and sodium alcoholate, these alkyl radicals being the same or different and being selected from a group of monovalent radicals derived from a saturated hydrocarbon, and reacting the thus formed mixture containing sodium alkyl formyl acetate with an alkaline suspension of a guanidine salt.

4. The continuous method of preparing isocytosine by reacting in a nonreacting solvent an alkyl formate and an alkyl acetate in the presence of a member of the group consisting of sodium and sodium alcoholate, these alkyl groups being the same or different and being selected from a group of monovalent radicals derived from a saturated hydrocarbon, reacting the thus formed mixture containing sodium alkyl formyl acetate with an alkaline suspension of a guanidine salt, decomposing the formed sodium isocytosine with an acid and collecting the free isocytosine.

5. In a continuous method of preparing isocytosine the steps which comprise reacting in a nonreacting solvent an alkyl formate with an alkyl acetate in the presence of a member of the group consisting of sodium and sodium alcoholate, these alkyl radicals being the same or different and containing 1-9 carbon atoms and being selected from a group of monovalent radicals derived from a saturated hydrocarbon, and reacting the thus formed mixture containing sodiumethyl formyl acetate with an alkaline suspension of a guanidine salt.

6. The continuous method of preparing isocytosine by reacting in a nonreacting solvent an alkylformate with an alkyl acetate in the presence of a member of the group consisting of sodium and sodium alcoholate, these alkyl radicals being the same or different and containing 1-9 carbon atoms and being selected from a group of monovalent radicals derived from a saturated hydrocarbon, reacting the formed sodium alkyl formyl acetate with an alkaline suspension of a guanidine salt, decomposing the thus formed mixture containing sodium isocytosine with an acid and collecting the free isocytosine.

7. In a continuous method of preparing isocytosine the steps according to claim 1 where ethyl formate is reacted with ethyl acetate in the presence of sodium methylate.

8. In a continuous method of preparing isocytosine the steps according to claim 1, where ethyl formate is reacted with ethyl acetate in the presence of sodium butylate.

9. In a continuous method of preparing isocytosine the steps according to claim 1, where butyl formate is reacted with butyl acetate in the presence of sodium butylate.

EDMOND T. TISZA.
BERNARD F. DUESEL.
WILLIAM OROSHNIK.